United States Patent [19]

Wiggs

[11] Patent Number: 5,272,879
[45] Date of Patent: Dec. 28, 1993

[54] MULTI-SYSTEM POWER GENERATOR

[76] Inventor: B. Ryland Wiggs, 3630 Villanova Ct., Bethlehem, Pa. 18017

[21] Appl. No.: 842,468
[22] Filed: Feb. 27, 1992
[51] Int. Cl.⁵ .............................................. F01K 13/00
[52] U.S. Cl. ...................................... 60/676; 60/641.2; 60/641.6; 60/698; 60/671; 165/45
[58] Field of Search ....................... 60/641.2, 651, 671, 60/641.1, 641.6, 676, 698; 165/45

[56] References Cited

U.S. PATENT DOCUMENTS

| | | | |
|---|---|---|---|
| 3,292,366 | 12/1966 | Rice et al. | 60/651 |
| 3,995,429 | 12/1976 | Peters | 60/676 X |
| 4,037,413 | 7/1977 | Heller et al. | 60/655 |
| 4,087,975 | 5/1978 | Owens | 60/641.7 |
| 4,189,924 | 2/1980 | LaCoste | 60/641.7 |
| 4,290,266 | 9/1981 | Twite et al. | 60/641.2 |
| 4,293,384 | 10/1981 | Weber | 376/391 |
| 4,302,682 | 11/1981 | LaCoste | 290/1 R |
| 4,423,599 | 1/1984 | Veale | 60/641.8 |

*Primary Examiner*—Stephen F. Husar
*Attorney, Agent, or Firm*—Eckert Seamans Cherin & Mellott

[57] ABSTRACT

A geothermal power system utilizes a fluid refrigerant capable of changing phase between liquid and gaseous states. The system includes a heat exchanger exposed to a heat source such as earth, water, air, or industrial waste for vaporizing the fluid in the heat exchanger. The heat exchanger includes at least two compartmentalized heat exchanger cells. Each of the heat exchanger cells is disposed in a portion of the naturally occurring heat source, the portions being sufficiently spaced apart such that a temperature of any one portion is substantially unaffected by a temperature of any other portion. The vaporized fluid is directed to a turbine or energy extraction means wherein the gas is expanded and energy is released in the form of mechanical rotation of a shaft. The turbine shaft may be coupled to a generator for converting the mechanical rotational energy to electrical power. The gas discharged from the turbine is cooled/condensed and circulated into an accumulator, with a sensor and a controller for continuously maintaining the optimum amount of refrigerant flowing in the system under particular heat source/heat sink conditions. The liquid refrigerant is then recirculated to the heat exchanger, and the process is performed continuously. A compressor and sensored and controlled accumulator may be utilized in a second and separate refrigerant heat exchange loop with compartmentalized heat exchanger cells if necessary to maintain continuous output from the geothermal power system under all temperature conditions.

14 Claims, 2 Drawing Sheets

MULTI-SYSTEM POWER GENERATOR

BACKGROUND OF THE INVENTION

1. Field of the Invention

The invention relates to a power generation system which utilizes naturally occurring low grade heat energy at or near the earth's surface to produce mechanical or electrical power.

2. Prior Art

Systems for generating power convert the thermal energy difference between a heat source and a heat sink to useful power by driving a generator or other power output while transferring heat energy from the source to the sink. Such systems are most efficient where the difference in the temperature between the source and sink is the greatest. Geothermal power generation systems are known which rely on heat from high temperature sources, located in an area of volcanic activity and/or far below the earth's surface, generally at depths of from 100 to 30,000 feet. The heat is extracted from maqma or superheated rock, and carried to the surface by water, brine, etc. The heat is then extracted at the surface, and various uses can be made of the heat, including operating a turbine or other device coupled to an electric generator. Whereas the surface temperature is always lower than such high temperature sources, the heat extraction technique can be used to generate power.

A power generation system of this type may use a circulating coolant which is changed between a liquid phase and a gas phase in each pass around the circulation loop, the changes being a result of the temperatures encountered at the source and at the sink. For example, pressurized liquid coolant is heated and phase changed into a gas on the hotter side of a circulation loop, and after driving a turbine-generator or the like at which the heated coolant is allowed to expand and cool, the now-gaseous coolant is condensed and depressurized to the liquid phase on the cooler side of the circulation loop, proceeding again around the loop to the hotter side. The coolant is circulated continuously around the loop, generally using the temperature difference between the hotter and cooler sides as the power source for driving the turbine.

Apart from direct association with volcanic activity, the underground temperature of the earth near the surface, where insulated from day to day surface temperature variations, is a relatively stable temperature in the mid 50° Fahrenheit range. However, at any particular time of the year the temperature at the surface, specifically the surface air temperature, may be higher or lower than the temperature of the earth beneath the surface. The earth's underground temperature also increases roughly 88° Fahrenheit per mile of depth.

It is known to use the temperature difference between a heat source or sink at a temperature nearly equal to the surface air temperature to move heat energy into or out of a building or other heating/cooling load, by use of a similar circulating coolant system known as a heat pump. The coolant is heated (or cooled) at a heat exchanger located outside of a building and the heat is extracted (or the coolant extracts heat) at a heat exchanger disposed in the building, one or both heat exchangers normally being associated with fans for moving air over the heat exchanging surfaces. Such systems do not produce mechanical or electrical energy from the temperature difference. The systems simply extract heat or sink heat between the building and the outside heat exchanger, using electrically powered fans and pumps.

Known systems for tapping the ever abundant heat source of the earth below the surface, for the purpose of generating power, typically convert water into steam for driving a turbine or operating a refrigeration plant. For example, see U.S. Pat. Nos. 4,091,623; 4,142,108; 4,189,923; 4,255,933; and 4,388,807. The systems require passages leading deep into the earth. Drilling expenses, passage obstruction problems, shifting of the earth associated with volcanic activity, and other expenses or technological problems generally render these ostensibly good ideas economically unrealistic and infeasible.

Power generation systems have also been developed to utilize temperature differentials due to the cooling of ocean water at depth, or as provided due to prevailing currents. Generally, ocean water near the surface, which is warmed by the sun, provides the heat source, and colder deeper ocean water provides a significantly cooler temperature differential, enabling the generation of mechanical and electrical power. See, for example, U.S. Pat. Nos. 4,087,975; 4,189,924; and 4,302,682. Oceanic thermal difference energy conversion systems are theoretically attractive for generating power, however their application is obviously limited to ocean areas and the cooler-side heat exchanger must be very deep to obtain a substantial temperature difference compared to the surface temperature. As with the deep well geothermal systems, from a practical standpoint these proposed power generation systems are quite large, as considered necessary to be economically feasible in many applications. Also, major potential problems remain, including weather problems (e.g., hurricanes and typhoons), tides, shipping traffic, barnacles, corrosion due to long-term exposure to sea water, etc.

In U.S. Pat. No. 4,290,266, a coolant or refrigerant line is placed sufficiently deep for geothermal heat to convert gravity drained liquid refrigerant into a gas under high pressure for use in driving a turbine. The concept of using a phase changing coolant or refrigerant other than water is the same as that of changing water into steam and back for driving a turbine in a geothermal system. However, the refrigerant is normally chosen such that it has a boiling point suitable for the temperature levels of the system design and thus is readily changed in phase by the temperatures encountered on the hotter and cooler sides of the loop. On the other hand, the refrigerant concept has significant operational problems when one attempts to apply it to geothermal power generation due to the requirement for substantial vertical conduit lengths between the surface and the subsurface heat exchangers. For example, there is no ready means to force the refrigerant dependably under power around the circulation loop, due to the phase differences between the heavier and less compressible liquid and the lighter and more-compressible gas phases. Once gravity fed liquid refrigerant is phase changed into a gas, it is difficult to force it further downward, because the low density gas tends to rise in the higher density liquid refrigerant. In short, it is difficult to move the refrigerant in a loop to a sufficiently hot subterranean depth, prior to phase change, for naturally producing the pressures needed for significant power generation. Once the liquid refrigerant changes phase from a liquid to a gas, the effects of gravity flow are substantially diminished. Inasmuch as the most remote point in the circulation loop may be far below the surface, such gravity flow refrigerant systems ultimately suffer from poor system equilibrium and periods of in operation. Other problems include inability of the system to operate in a reverse direction, inability to recover geothermal heat on the heat extraction side after extended operating periods, and typically, high costs and associated problems encountered with deep wells.

Another approach for a refrigerant type power generation system is disclosed in U.S. Pat. No. 3,995,429 (Peters). This patent describes the production of a pressurized vapor via selective utilization of temperature differentials in two of three or more heat sources or sinks, each of which varies in temperature over time. A fluid pump is powered by an electric motor for moving liquid refrigerant around a loop including selected ones of the sources and sinks. Controls and valves are provided for switching between heat and heat sink sources having the most efficient (highest) naturally occurring temperature differential. The disclosure of the patent teaches heat sources including a solar energy absorber, a radiator placed in the earth or in water, and an atmospheric heat exchanger. One obvious problem with this system, as noted in the patent, is that under certain conditions there is no sufficient temperature difference between any two of the heat, or heat sink, sources, whereupon all action stops. This results in a lack of continuous and dependable power. Moreover, refrigerant equilibrium problems and imbalances in refrigerant quantities occur and must be accurately and consistently controlled to effect appropriate refrigerant phase changes under varying load and temperature differential conditions and to effectively generate power. For example, Peters neglects to provide a means to overcome the negative effects which will operationally be realized when the vaporized refrigerant encounters pressure resistance from the turbine and exerts a back pressure against and/or into the liquid refrigerant exiting the liquid refrigerant pump and/or source. Such back pressure can severely hamper system operational efficiency, ultimately placing as much of a power drain on the circulating pump as the turbine is able to produce from the coolant. This back pressure can result in system equilibrium loss and shut down. Further, the Peters invention neglects to provide for a coolant accumulator/dispenser system which will automatically sense conditions and adjust the amount of refrigerant contained in the circulation loop at any given time to maintain optimum conditions for the particular heat source/heat sink system being utilized for power generation. Such a refrigerant supply control is critical for optimum system operation under varying temperature conditions. For example, when operating under relatively colder temperature conditions, a larger quantity of refrigerant is required to achieve optimum performance than when operating under relatively hotter temperature conditions. If refrigerant quantities in the system are not controlled and reduced when operating between the warm sun and warm air and/or warm water and/or warm earth in the summer, as opposed to colder identical heat and heat sink sources in the winter, pressures may become so high or so low as to result in pump and/or generator burn out or malfunction.

The present invention overcomes these problems by providing a geothermal power system and method which utilizes a low grade, naturally occurring heat source found at or near the surface of the earth. The invention provides a heat exchanger having two or more compartmentalized heat exchanger cells in contact with the naturally occurring heat source for vaporizing a liquid refrigerant. The heat exchanger cells are spaced apart, and switchable valves are provided for selectively controlling refrigerant flow through the individual cells so that the heat source in the vicinity of each cell can alternately be given time to naturally recover heat after being drawn down by refrigerant vaporization. An accumulator/dispenser is provided with means to monitor and control refrigerant quantities in the system in order to maintain optimum system temperatures and pressures and to prevent dangerous system overpressures or underpressures. A supplemental design utilizing two separate refrigerant loops may also be used, with the first loop utilizing a compressor for circulating the refrigerant, and for pressurizing and heating the vaporized refrigerant returning from the underground heat source, to a suitable temperature for ensuring a phase change in the secondary refrigerant loop for operating a turbine, reciprocating engine or other power extraction device which expands the pressurized gas and assists in converting the pressurized refrigerant back into the liquid phase. The turbine or other engine may be coupled to a generator for producing electricity. Alternatively, it can be used to provide mechanical power. The mechanical or electrical energy can be stored via compression of gas or hydraulic fluids, electrolysis, batteries, etc., for later use. Expansion valves and condensing cells are provided as necessary to maintain operational temperature/pressure differentials in the system. For the system with two separate refrigerant loops wherein the refrigerant in the first loop is continuously circulated by the compressor, the system, unlike Peters, is operational with extremely modest temperature differentials between the heat source and the heat sink.

The invention is particularly applicable to a ground source heat exchanger having temperature exchange coils which are buried in an array near the earth's surface, especially just below the frost line or heat line. For example, a sinuous pattern of copper or other thermally conductive tubing can be mounted along the walls of a simple backhoe trench to provide the subsurface heat exchanger. Similarly, a bored cylindrical hole can be lined with a helical pattern of heat exchange coils, rested along the sides of the hole before backfilling. The subsurface heat exchanger can be operated in conjunction with heat exchangers for the opposite side of the loop, including water based and ambient air heat exchangers, thus providing a versatile system for extracting power from naturally occurring temperature differences. The apparatus can be provided simply as a power generation device, or alternatively can be operated in a power generation mode only when not in use as a building HVAC heat pump system.

SUMMARY OF THE INVENTION

It is an object of the invention to provide a power generation system which is relatively simple to construct, operate and maintain.

It is another object of the invention to provide a power generation system which is cheaper to construct and operate than conventional systems.

It is a further object of the invention to provide a power generation system which can be built on either a small or large scale at almost any location.

It is yet another object of the invention to provide a power generation system which efficiently provides mechanical or electrical power with little or no damage to the environment.

It is still another object of the invention to provide a power generation system which utilizes naturally occurring heat sources having relatively small temperature differentials.

These and other objects are accomplished by a power generation system which utilizes a refrigerant fluid suitable for changing phase between liquid and gaseous states. In the first design, a heat exchanger absorbs heat from a low grade, naturally occurring heat source such as shallow earth, shallow water, air, solar or industrial waste heat. The heat exchanger includes two or more heat exchanger cells and selector valves for controlling refrigerant flow through each cell. The cells in any one naturally occurring heat source are sufficiently spaced apart so that each cell draws down heat from its local area with negligible effect on the heat content of the local area of any other cell. The individual heat absorption cells are permitted appropriate time to recover heat and gasify the liquid refregerant in them by shutting off and isolating the liquid refrigerant supply and the gaseous discharge until sufficient gas pressure is reached. The liquid refrigerant passes into one of the heat exchanger cells and is vaporized into a pressurized gas. Once sufficient gas pressure is reached, a valve opens and permits the pressurized gas to enter a turbine or reciprocating engine. The gas is expanded in the turbine, thereby giving up energy in the form of powered mechanical rotation of the turbine. The mechanical energy thus developed can be converted to electrical energy in a generator coupled to the turbine and/or stored via batteries, electrolysis, hydraulic or pneumatic fluids or gases, potential energy (e.g. by lifting a quantity of water), etc., for later use. After exhausting from the turbine, the expanded gas would be converted to a liquid in a condenser, which condenser can comprise one or more of the coolest compartmentalized heat exchange cells, to maintain system operating parameters. The liquid is then circulated back to the heat exchanger and the process is repeated. A pump may be provided for maintaining the liquid refrigerant flow to the heat exchanger cells A liquid refrigerant accumulator and control means such as valves are provided for directing the quantity and flow of the refrigerant through the system at optimum quantities, temperatures and pressures. Preferably the valves are solenoid valves coupled to outputs of a microprocessor controller which is also coupled to temperature and pressure sensors along the circulation path, and programmed to optimize system parameters by controlling the valves and refrigerant supply as appropriate to present sensed conditions.

A secondary design utilizes two separate refrigerant loops. The first loop utilizes a compressor for circulating the refrigerant through a condensing cell, which cools and liquifies the refrigerant, and through a heat source which heats and vaporizes the refrigerant. The compressor pressurizes and superheats the gaseous phase-changed gas exiting the heating source. The second loop operates in the manner as described hereinabove in the first design, except the heat source for the second power generation loop is the heat generated via the first refrigerant loop achieving refrigerant circulation by means of a compressor.

The compressor is a beneficial part of the invention. The compressor maintains refrigerant flow in the system even during periods of low temperature differentials, thereby overcoming the problem of the prior art systems which become inoperative in the event of low temperature differentials. Further, refrigerant flow is maintained at a sufficient velocity to prevent separation of lubricating oil out of suspension in the refrigerant. The compressor also provides a means of condensing and accelerating the effects of even modest temperature differentials, thus enabling the system to operate to take advantage of whatever temperature differences are available even when the differences are relatively small.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

A power generation system according to the invention utilizes a suitable fluid which changes phase from liquid to gaseous states at relatively modest temperatures and at pressures which are maintained in the system as hereinafter described. In particular the fluid is chosen to undergo a liquid to gas phase change readily at the temperatures encountered in a heat exchanger disposed in contact with a low grade, naturally occurring or waste heat source, and is pressurized according to the invention such that the phase change from liquid to gas occurs at a point in the circulation loop where the phase change can be used to drive a mechanical means for extracting energy, i.e., at a turbine or other engine which extracts mechanical energy by allowing pressurized gas to expand to a larger volume. The gas may be a commonly used refrigerant such as Freon 12 or Freon 22, or ammonia, or another known refrigerant. The fluid is communicated throughout the system by conduit means such as pipe or tubing connected between successive stages in the system.

Figure 1:
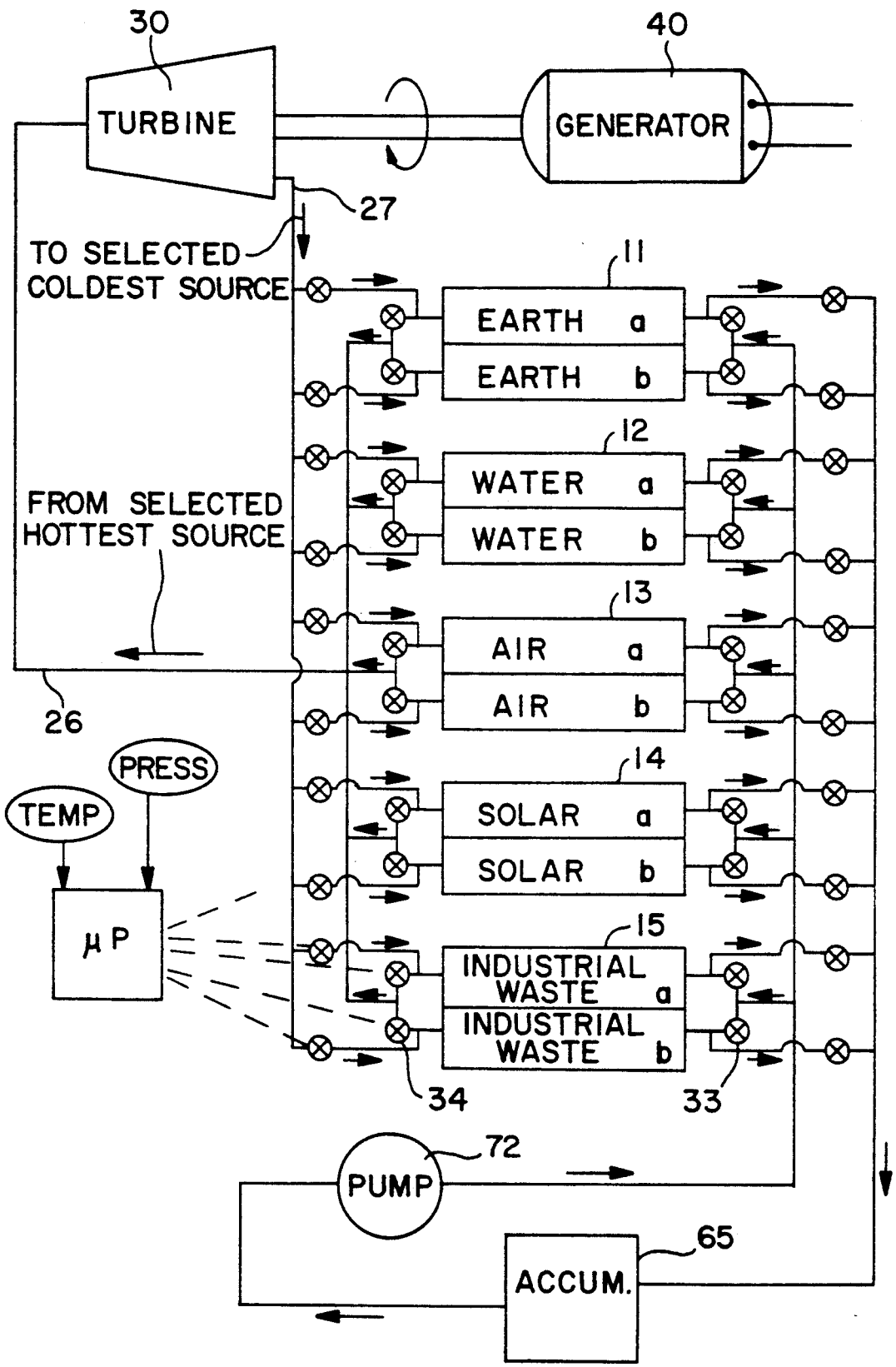
FIG. 1 is a schematic view illustrating an exemplary embodiment of the power generation system according to the invention.

According to a first embodiment of the invention, one or more heat exchangers is disposed in thermal communication with a heat source. As illustrated schematically in FIG. 1, heat exchangers 11, 12, 13, 14, 15 are disposed in thermal communication with a naturally occurring or waste heat source such as geothermal, water, air, solar energy, or an industrial waste heat source, respectively. The, for example, geothermal heat exchanger should be placed sufficiently below the earth's surface to provide a dependable source of heat at least at the typical subsurface temperature of 55° F., and where available may be placed in thermal communication with a warmer temperature source.

According to the invention, the heat exchangers 11, 12, 13, 14, 15 need not be, but could be, in thermal communication with a high temperature heat source. The invention can utilize heat retained in shallow earth, shallow water, air or other substance at moderate temperatures. For example, the geothermal heat exchanger 11 preferably comprises a plurality of substantially horizontal tubes disposed in the earth at a distance of one or two feet below the frost line for the geographic locality of the system, in order to minimize the depth of excavation required for subterranean placement of the heat exchanger while preventing the tendency of the tubes to become displaced due to frost heaving or to become inefficient due to proximity to cold surface conditions. A suitable heat exchanger is disclosed in patent application Ser. No. 725,962, filed Jul. 5, 1991, entitled MODULAR TUBE BUNDLE HEAT EXCHANGER AND GEOTHERMAL HEAT PUMP SYSTEM, hereby incorporated by reference. Alternatively, the heat exchanger may be disposed in shallow water or in air, or exposed to heat from solar energy or industrial waste heat, provided the heat exchanger is disposed to be heated relative to the temperature of the expanded (cooled) refrigerant which has been passed through the turbine or other mechanical energy extraction means. Only modest temperatures are required for operation of the system according to the invention, however, it is advantageous to employ the maximum temperature differential which is available, for best efficiency.

Each of the heat exchangers includes at least two compartmentalized heat exchanger cells designated a and b and placed in different locations having potentially different temperatures. The different locations can be in different portions of one source of heat, the portions being sufficiently spaced apart that a temperature of any one portion is not substantially affected by a temperature of any other portion. Thus, the cooler fluid refrigerant flowing into one of the heat exchanger cells draws heat from the portion of the heat source associated with that cell, but does not draw down any substantial amount of heat from the portion of the heat source associated with any other cell in the heat source as a whole. The use of spaced apart heat compartmentalized heat exchanger cells allows the refrigerant to be contained in one of the cells for a time sufficient to permit complete vaporization and appropriate pressurization of the refrigerant in the one cell while allowing the other cell time to discharge its already heated and pressurized gas into the turbine 30. Temperature sensing means associated with each of the heat exchanger cells 11,12,13,14,15 are coupled to a control device which senses the temperature for each portion of the heat source having a heat exchanger cell. The control device, which may comprise a programmed microprocessor coupled to sensors associated with the respective heat sources or portions, determines the temperatures available and chooses the highest temperature and greatest temperature differential of the respective heat source portions. Via controllable valves coupled to the circulation passages the control device selects and switches the circulation loop to traverse one or more of the available heat exchanger cells. In this manner the control device avails the system of the particular heat source portion which has the greatest heat reserve and/or the greatest capacity and highest difference in temperature. U.S. Pat. No. 3,995,429 to Peters discloses a suitable sensing means and switching means for selecting among different heat sources, and the disclosure is hereby incorporated for the particulars of sensing and control arrangements which can select among plural sources to obtain the greatest available thermal energy difference. It is also possible to arrange a similar function using, for example, other mechanical controls and/or a microprocessor coupled to suitable temperature sensors and valve actuators. As shown generally in FIG. 1, control valves 33, 34 are provided at the inlet and outlet of each of the heat exchanger cells to selectively arrange the fluid circulation loop to include whichever of the heat exchanger cells will provide the greatest heat source, as determined by the sensing and control means. This valving arrangement can direct the fluid to traverse more than one of the heat exchanger cells, for example to take advantage of the possibility that more than one of the heat exchanger cells is at a usefully tapped temperature.

The refrigerant fluid is maintained within the respective heat exchanger cells a, b where it receives heat from the heat source portion in which the heat exchanger cell is in thermal communication. The refrigerant in the respective heat exchanger cells is changed into its gaseous phase and, once a sufficient pressure is reached, the pressurized refrigerant gas opens a pressure valve, or is released from the cells via timed sequence valves or a pressure sensor. The individual, compartmentalized heat exchanger cells provide the advantage of permitting retention of the refrigerant in one cell so that it has time to absorb sufficient heat to vaporize and pressurize the refrigerant completely, while simultaneously permitting release of the refrigerant which has been vaporized and pressurized in another cell so that pressurized refrigerant is kept available for operating a turbine means as hereinafter described. The individual compartmentalized heat exchanger cells further provide the advantage of eliminating back pressure against and/or into the liquid refrigerant and against a liquid refrigerant pump hereinafter described, which back pressure would otherwise substantially undermine system operational efficiency and/or result in system equilibrium loss and shutdown.

The vaporized refrigerant flows through conduit 26 to a turbine means such as turbine 30, or any other rotary, reciprocating, stirling, inertial or scroll engine. In the presently preferred turbine embodiment, the gas is directed through nozzles to impinge on a plurality of blades connected to a rotatable shaft. The gas acting on the blades is expanded at the nozzles and energy thereby extracted from the pressurized gas is converted into rotational (mechanical) energy of the turbine shaft. The shaft may be coupled to any apparatus which can appropriately utilize the mechanical energy, and preferably is arranged to store the energy by mechanical, electrical or chemical means. For example, the shaft may be coupled to an electric generator means 40 for generating electrical power, which can be utilized by coupling to the electric mains via an inverter, or stored in batteries. The system may be operated for electrical power generation via direct current generation and/or via alternating current generation, with constant output and/or turbine speed and/or generator load maintained via use of an eddy current clutch and/or via controlling areas exposed to the low grade heat source and/or via introduction of pressurized gas in subatmospheric operation. The mechanical or electrical power can be also be used or stored, for example, by raising a fluid or other weight, by pressurizing a reservoir, by electrolysis, etc.

After expansion and energy extraction, the refrigerant gas is circulated back through conduit 27 to one of the heat exchangers 11, 12, 13, 14, 15 acting as a condenser in a relatively cooler one of the potential heat sources which now acts as a heat sink. The control valves 33, 34 are operated by the sensing and control device to admit the refrigerant gas to whichever of the heat exchangers is disposed in the greatest and coldest heat sink source. The refrigerant is cooled and liquified in the heat exchanger acting as the condenser, thereby reducing the pressure in the coolant conduit 27 on the downstream side of the turbine or other engine. If necessary, the refrigerant gas could be isolated and maintained in the compartmentalized heat exchanger cells for a period of time so that excessive heat would have adequate time to be removed in each cooling cell, for reducing the pressure in this area of the loop.

After release from the condenser, the liquid refrigerant flows to an accumulator/dispenser 65 having means for sensing and adjusting an optimum amount of liquid refrigerant in the system. The refrigerant released from the accumulator/dispenser 65 is pumped via liquid refrigerant pump 72 back into whichever of the heat exchangers is disposed in the greatest heat source, as determined by the sensing and control device, and the process is repeated. Thus, the power generation system according to the invention comprises numerous potential refrigerant loops for generating mechanical or electrical energy, with sensing, control and valve means for circulating refrigerant through an active loop which includes the isolated and compartmentalized heat exchangers disposed in the greatest heat source and the greatest heat sink at any given time.

The liquid refrigerant accumulator/dispenser 65 is used for automatically sensing and adjusting, via mechanical controls and preferably via a procedure of calculations or parameter look-up functions supervised by a micro-processor, the proper amount of refrigerant to be utilized at any given time under the particular refrigerant supply/pressure requirements necessitated via the particular temperature differentials and pressure conditions existing between the particular heat source/heat sink portions selected as active at the time. Absent continuous and correct adjustment of the refrigerant supply to the active loop, based upon actual operational temperature differentials, it is difficult or impossible to achieve efficient, or even actual, refrigerant phase change, as needed to optimize operational efficiency.

The power generation system may be microprocessor controlled to achieve optimum temperatures and pressures for best system efficiency. A flash evaporating system, with a subatmospheric pressure range turbine, may be utilized to optimize performance below atmospheric pressures. Whereas the system operates by providing a phase change in the refrigerant between the hotter and cooler sides of the circulation loop, together with stepping up the pressure of the refrigerant gas preceding the mechanical energy extraction means, it is possible selectively to operate the system at different points in the pressure/temperature/phase chart which characterizes the particular coolant chosen.

Figure 2:
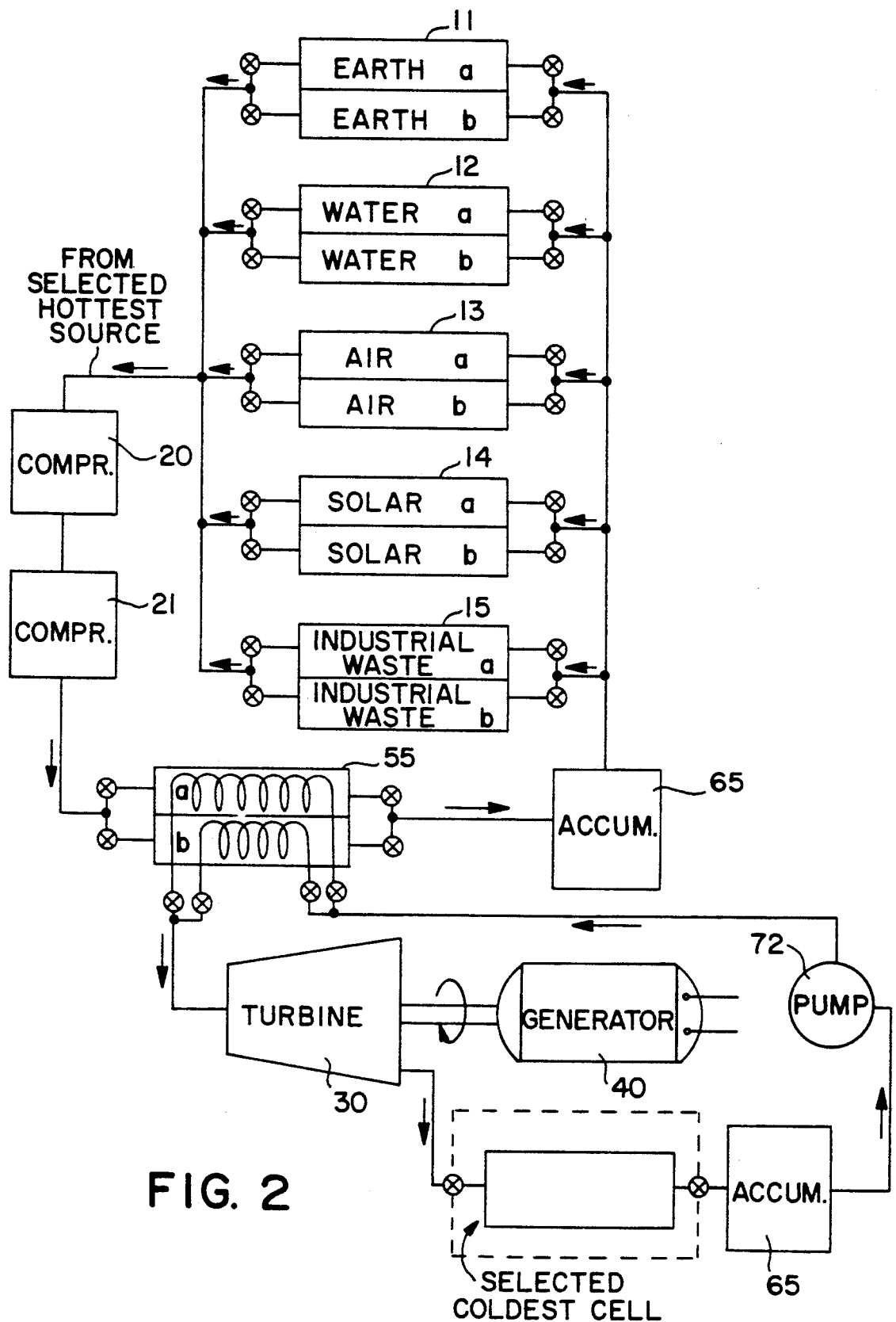
FIG. 2 is a schematic view illustrating an alternative embodiment of the power generation system according to the invention.

According to a second embodiment of the invention as shown in FIG. 2, two separate refrigerant circulation loops are provided. Like elements of the first and second embodiments are referred to in the drawings by like reference numbers. In the first loop of the second embodiment, the refrigerant gas exiting at least one selected heat exchanger 11, 12, 13, 14 or 15 flows to a compressor means 20. The gas enters the compressor means at a temperature, for example, if from an earth heating source, between approximately 25° and 60° F. and at a pressure between about 50 and 100 pounds per square inch (PSI). The compressor means compresses the gas and raises its temperature such that the gas discharged from the compressor is slightly superheated.

The compressor means may include, e.g., a reciprocal, scroll, rotary, or inertial type compressor. The compressor means not only moves the gas and the liquid refrigerant in the first loop, independently of gravity and/or independently of a liquid pump 72, as contained in the second loop, but more importantly, it provides a means of condensing and accelerating the effects of even modest renewable temperature differentials. Consequently, it is not necessary to wait for or to rely only upon naturally occurring significant temperature differentials. Instead, continuous power is provided via the much more dependable modest temperature differentials existing due to various thermal energy situations which are virtually always readily available. A modest but dependable thermal differential exists, for example, between the earth in one's yard and the atmosphere directly above it. Various industrial processes produce modest but dependable thermal temperature differentials between gaseous or fluid effluent and the ambient air or water. These sources/sinks can be exploited according to the invention, or the invention may be applied to exploit the temperature difference between any two appropriate heat sources and sinks which can be placed in thermal communication with a heat exchanger.

The compressor means may include a plurality of serially coupled compressors 20 and 21 in order to achieve a sufficiently high gas temperature differential for optimum performance of the mechanical energy extraction means, which in the preferred embodiment comprises a gas turbine. While it would be desirable to utilize only one compressor in order to avoid efficiency losses occasioned by additional compressor units, more than one compressor may be utilized when marginal conditions require that the pressure and/or temperature condition of the compressed gas be stepped up via secondary or secondary and tertiary compressors, etc. A single compressor may raise the pressure of the refrigerant by an amount equivalent to raising the refrigerant temperature as compared to the output of the naturally occurring heat source gas temperatures by 100° F., or more. When higher gas temperatures are necessary to effectively operate the turbine or the like, the initially compressed gas may be stepped up to a second higher temperature/pressure condition via a next compressor, and to a third compressor, and so on, as necessary. The gas discharged from the compressor means, if from an earth source, will typically have a temperature between approximately 120° and 200° F., and a pressure between approximately 200 and 325 PSI.

Two or more compartmentalized heat exchanger cells are preferably alternately used with the compressor means in the first closed loop so as to allow respective cell heat recovery time when the system is in continuous operation. Sensors and valves automatically control refrigerant flow through the respective heat exchanger cells. Additionally, as in the power generation system of the first embodiment, a controlled liquid accumulator/dispenser 65 automatically adjusts the optimum amount of refrigerant flowing through the first loop refrigerant system.

The compressed and superheated refrigerant gas in this first closed loop system, which contains the heat energy acquired from the sun, the air, or from a ground or water mass, or from industrial waste heat or other source, as aforesaid, transfers the accentuated heat energy to a separate and second closed loop refrigerant system via thermal coupling means such as an isolated and compartmentalized a b refrigerant to refrigerant heat exchange coil 55. This method of heat energy transfer eliminates efficiency destructive back pressure on the compressor in the first loop. The exchange coil 55 includes separate pathways for the refrigerant in the first and second loops, such as two tubes spiraled around each other in direct contact, or one tube containing the hot gas exiting the compressor of the first loop disposed within a separate tube containing cooler liquid refrigerant of the second loop. In the exchange coil 55, heat is transferred from the hot refrigerant gas exiting the compressor in the first closed loop system to the cooler liquid refrigerant in the second closed loop system, which refrigerant in the second loop, when heated and vaporized to become a pressurized gas, drives the turbine or other motor means 30 so as to create mechanical power, which can be used to drive the electrical generator 40. At least one of the cells defining a selected coldest source is controllable coupled into the conduit on the downstream side of the turbine.

A power generation system according to the invention, whether a single refrigerant loop (as in the first embodiment) or a double refrigerant loop (e.g., the second embodiment), can operate in conjunction with a ground source heating/cooling system which is either a water-based or direct refrigerant exchange type system. Such a ground source heating/cooling system is described in U.S. Pat. No. 5,025,634, which is hereby incorporated by reference. The invention can either operate independently in a separate parcel of land, or immediately adjacent to, or in close proximity with the heat exchange coils of a ground source heating/cooling HVAC system, especially in warm climates. Furthermore, the system can employ at least one of the heat exchangers of an HVAC system when not in use.

Where power generation system heat exchangers and heating/cooling system heat exchangers are located in close proximity to one another (typically immediately adjacent to one another or within a two foot distance of one another), the two separate systems preferably operate in a reverse fluid flow arrangement one from the other. This allows each of the systems to supplement the other system's efficiency by adding to the temperature differentials encountered. For example, in a warm climate, a ground source air conditioning system extracts heat from interior air and rejects the heat into the ground. A power generation system, with a ground source heat exchanger in close proximity to a ground source heat exchanger of the heating/cooling system, would extract normal ground heat, as well as waste heat dissipated in the ground from the heating/cooling system, and reject waste heat into exterior air via a conventional exterior air heat exchanger. This process, which is a form of recovery of waste heat, also aids the heating/cooling ground source heat exchanger in dissipating waste heat, which thus does not accumulate as rapidly in the ground. Operation of the power generation aspects of the invention thereby can assist in air conditioning efficiency.

Further, in lieu of placing ground based heat exchange coils from the heating/cooling system in close proximity to the ground based heat exchange coils in the power generation system, the excess heat from the heating/cooling system could be conveyed to the power generation system, or vice versa, via a direct heat refrigerant to refrigerant exchange coil. The refrigerant to refrigerant heat exchange coil would comprise a "hot" refrigerant tube from one of the systems, carrying extra and/or waste heat, coiled around another tube with cooled refrigerant from the other system Which cooled refrigerant is in sequence to absorb heat and expand. The refrigerant to refrigerant heat exchange coil could also consist of a tube, with refrigerant from one system, within another tube, with refrigerant from the other system, in order to accomplish the same heat exchange step.

Sensors and mechanical and/or microprocessor controls preferably are coupled to each of the respective circulation paths, to monitor and control proper heat exchange between the two systems such that each system operates at the maximum available efficiency under varying ambient conditions for each of the heat exchangers.

For the geothermal power system having a heat exchanger disposed in water or in the air, the heat exchanger could include tubing, or rifled tubing, having internal or external fins for maximizing heat transfer. Such a heat exchanger could be relatively smaller than a heat exchanger having the same capacity which is disposed in earth, due to the added factors of improved thermal transfer and the existence of convection currents in the water.

Individual tubes of the heat exchangers 11, 12, 13, 14, 15 and the heat exchange coils 55 are generally constructed of copper or aluminum or some similar highly conductive metal or plastic or material. Copper, however, when placed in soil or water, is subject to corrosion in the form of oxidation. The chemical reaction behind the oxidation of a metal, such as copper, involves a loss of electrons from the metal. To prevent a loss of electrons from the tubes of the heat exchangers and heat exchange coils, cathodic protection may be provided. The cathodic protection method as known in the art involves a sacrificial anode which is electrically coupled directly to a tube in each of the heat exchangers and heat exchange coils. In a chemical reaction between the copper tubes, the sacrificial anode, and the soil or water, the sacrificial anode releases electrons which travel to the copper tubing through a wire or other electrical coupling device. The copper tubing emits electrons to the soil or water which acts as an electron sink. The copper, although losing electrons to the soil or water, is continuously supplied with electrons from the sacrificial anode. The copper tubing therefore does not experience a net loss of electrons and hence does not oxidize and corrode. The sacrificial anode does experience a net loss of electrons and will oxidize over time, but can easily and inexpensively be replaced.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

I claim:

1. A power generation system of the type having a refrigerant fluid suitable for changing phase between liquid and gaseous states, comprising:

heating or vaporizing means for transferring heat to the fluid from at least one heat source, the heating or vaporizing means including at least two compartmentalized heating or vaporizing heat exchanger cells, each of the heating or vaporizing heat exchanger cells having a heat conductive construction and defining a controlled inlet, a controlled outlet, and a passageway for refrigerant, each of the heating or vaporizing heat exchanger cells being disposed in a portion of the at least one heat source, the fluid in the heating or vaporizing means being changed in phase from a liquid to a gas;

energy extraction means for extracting mechanical energy from the gas;

cooling or condensing means located in at least one cooling source for converting the refrigerant gas to a liquid, the cooling or condensing means including at least two compartmentalized cooling or condensing heat exchanger cells, each of the cooling or condensing heat exchanger cells having a heat conductive construction and defining a controlled inlet, a controlled outlet, and a passageway for refrigerant, each cooling or condensing heat exchanger cells being disposed in a portion of the at least one cooling source, the fluid in the cooling or condensing means being changed in phase from a gas to a liquid;

accumulator means for holding and adjusting a volume of fluid in the system;

pressure control means for preventing flow of the refrigerant gas between the energy extraction means and at least one of the cells of the heat exchanger means, until refrigerant gas in the respective said cell reaches a pre-selected pressure;

pump means for circulating the fluid in the system;

control valve mans associated with at least one of said controlled inlets of the heat exchanger cells and controlled outlets of the heat exchanger cells for selectively directing the refrigerant through different ones of the heat exchanger cells; and, conduit means for communicating the fluid between successive stages in the system such that the fluid is routed successively through the heating or vaporizing means, energy extraction means, cooling or condensing means, accumulator means and pump means.

2. The system according to claim 1, wherein the at least one heat source includes one of earth, water, air, solar energy and waste heat.

3. The system according to claim 1, wherein the energy extraction means is operatively coupled to a generator means for producing electrical power.

4. The system according to claim 1, wherein the energy extraction means includes one of a turbine engine, a stirling engine, a scroll engine, a rotary engine, an inertial engine, and a reciprocating engine.

5. The system according to claim 1, further comprising at least one of hydraulic and pneumatic means operatively coupled to the energy extraction means for storing energy by compression of at least one of a fluid and a gas.

6. A power generation system of the type having refrigerant fluid suitable for changing phase between liquid and gaseous states, comprising:

a first refrigerant loop having a first refrigerant fluid;

a second refrigerant loop having a second refrigerant fluid; and, thermal coupling means for transferring heat from the first refrigerant fluid to the second refrigerant fluid;

the first refrigerant loop including:

heating or vaporizing means for transferring heat to the first refrigerant fluid form at least one heat source, the heating or vaporizing means including at least two compartmentalized heating or vaporizing heat exchanger cells, each of the heating or vaporizing heat exchanger cells having a heat conductive construction and defining a controlled inlet, a controlled outlet, and a passageway for refrigerant, each of the heating or vaporizing heat exchanger cells being disposed in a portion of the at least one heat source, the portions being sufficiently spaced apart such that a temperature of any one portion is substantially unaffected by a temperature of any other portion, the first refrigerant fluid in the heating or vaporizing means being changed in phase from a liquid to a gas;

control valve means operable for selectively directing the first refrigerant fluid through different ones of the heating or vaporizing heat exchanger cells;

compressor means for pressurizing, heating, and circulating the first refrigerant gas;

a first pathway in the thermal coupling means wherein the first refrigerant gas transfers heat to the second refrigerant fluid;

accumulator means for holding and adjusting a volume of the first refrigerant fluid circulating in the first refrigerant loop; and, conduit means for communicating the first refrigerant fluid between successive stages in the first refrigerant loop such that the first refrigerant fluid is routed successively through the heating or vaporizing means, compressor means, thermal coupling means, condenser means, and accumulator means;

the second refrigerant loop including:

pump means for circulating the second refrigerant fluid in the second refrigerant loop;

a second pathway in the thermal coupling means wherein the second refrigerant fluid is changed in phase from a liquid to a gas;

energy extraction means for extracting mechanical energy from the second refrigerant gas;

cooling or condensing means located in at least one cooling source for converting the refrigerant gas to a liquid, the cooling or condensing means including at least two compartmentalized cooling or condensing heat exchanger cells, each of the cooling or condensing heat exchanger cells having a heat conductive construction and defining a controlled inlet, a controlled outlet, and a passageway for refrigerant, each of the cooling or condensing heat exchange cells being disposed in a portion of the at least one cooling source, the portions being sufficiently spaced apart such that a temperature of any one portion is substantially unaffected by a temperature of any other portion, the fluid in the cooling or condensing heat exchanger means being changed in phase from a gas to a liquid;

accumulator means for holding and adjusting a volume of the second refrigerant fluid circulating in the second refrigerant loop; and, conduit means for communicating the second refrigerant fluid between successive stages in the second refrigerant loop such that the fluid is routed successively through the pump means, thermal coupling means, energy extraction means, condensing or cooling means, and accumulator means.

7. The system according to claim 6, wherein the at least one heat source includes one of earth, water, air, solar energy and waste heat.

8. The system according to claim 6, wherein the compressor means comprises a plurality of compressors each pressurizing the first refrigerant gas in successive stages.

9. The system according to claim 6, wherein the compressor means includes one of a reciprocal, a scroll, a stirling, an inertial, and a rotary compressor.

10. The system according to claim 6, further comprising at least one of hydraulic and pneumatic means operatively coupled to the energy extraction means for storing energy by compression of at least one of a fluid and a gas.

11. The system according to claim 6, wherein the energy extraction means is operatively coupled to generator means for producing electrical power.

12. The system according to claim 6, wherein the energy extraction means includes one of a turbine engine, reciprocating engine, stirling engine, a scroll engine, a rotary engine, and an inertial engine.

13. The system according to claim 6, wherein the first and second pathways in the thermal coupling heating or vaporizing means include a pair of tubes spiraled around each other in direct contact.

14. The system according to claim 6, wherein the first and second pathways in the thermal coupling heating or vaporizing means include a pair of tubes disposed one within the other.

* * * * *